United States Patent
Shibata et al.

(10) Patent No.: US 6,226,264 B1
(45) Date of Patent: May 1, 2001

(54) ATM CELL MULTIPLEXER

(75) Inventors: Kenji Shibata; Kazunori Furukawa; Yoshihisa Ono, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/038,322

(22) Filed: Mar. 11, 1998

(30) Foreign Application Priority Data

Oct. 28, 1997 (JP) .................................................. 9-295588

(51) Int. Cl.$^7$ .................................................. H04L 12/56

(52) U.S. Cl. ..................... 370/232; 370/395; 370/474; 370/535

(58) Field of Search ..................................... 370/395, 412, 370/428, 429, 462, 474, 535, 536, 537, 538, 540, 542, 543, 544, 230, 231, 235, 359, 458, 461, 463, 232

(56) References Cited

U.S. PATENT DOCUMENTS

| | | | |
|---|---|---|---|
| 5,408,469 | * | 4/1995 | Opher et al. .......................... 370/474 |
| 5,539,738 | * | 7/1996 | Tibi et al. ............................. 370/474 |
| 5,737,312 | * | 4/1998 | Sasagawa et al. ..................... 370/232 |
| 5,946,309 | * | 8/1999 | Westberg et al. ..................... 370/395 |
| 5,982,777 | * | 11/1999 | Song ..................................... 370/415 |
| 6,021,135 | * | 2/2000 | Ishihara et al. ....................... 370/474 |

* cited by examiner

Primary Examiner—Ricky Q. Ngo
(74) Attorney, Agent, or Firm—Helfgott & Karas, P.C.

(57) ABSTRACT

An ATM cell multiplexer is arranged so that in the up direction from the terminal equipments/ATM cell interfaces to the ATM switchboard the ATM bus scheduler allocates the transmission rights for each CLAD unit in accordance with a preset schedule table and predetermined service categories or traffic control for the transmission of cells, and in the down direction from the ATM switchboard to the terminal equipments/ATM cell interfaces the cells are broadcast to all of the CLAD units which decide for the reception of the cells as to whether or not the cells are addressed to themselves.

14 Claims, 14 Drawing Sheets

CLAD:CELL ASSEMBLY/DISASSEMBLY UNIT

CLAD:CELL ASSEMBLY/DISASSEMBLY UNIT

CBR MEHOD

CELL TIMING rt-VBR METHOD

SCHEDULE TIMING AT MAX. FIXED RATE

SLOTS FOR ASSIGNING TRANSMISSION RIGHT TO OTHER CLADS

CELL TIMING

ATM CELL MULTIPLEXER

BACKGROUND OF THE INVENTION

1. Field of the Invention

The present invention relates to an ATM cell multiplexer, and in particular to an ATM cell multiplexer connected between terminal equipments and an ATM switchboard. "ATM (Asynchronous Transfer Mode)" technology is expected as a communication technology for realizing a multi-media society, and has been developed for fast data used in an inter-computer communication etc.

However, as seen from a recent ATM forum, a network is demanded in the market where the communication protocols of the prior art such as for voices, HDLC (High level Data Link) and FR (frame relay) can also be interworked with the ATM technology.

When such a network is constructed, it is useful to set up an ATM cell multiplexer as an apparatus in branch circuit or line system in order to construct an ATM switchboard (ATM switch) as a key network and to increase the accommodation efficiency of circuits with terminal equipments.

2. Description of the Related Art

FIG. 1 shows a general arrangement of such an ATM cell multiplexer. An ATM cell multiplexer generally designated by reference numeral 2 is adapted to assemble data received from a terminal equipment generally designated by reference numeral 1 in form of an ATM cell, to send the data to an ATM switchboard generally designated by reference numeral 3 through a trunk circuit, and to disassemble the ATM cell (hereinafter simply referred to as the cell) which is received through the trunk circuit from the ATM switchboard 3 and transmitted to the terminal equipment 1.

In this ATM cell multiplexer, although strict traffic control (QoS control) proper to the ATM protocol is demanded, the prior art ATM switchboard and ATM cell multiplexer installed an ATM switch (not shown) to perform the traffic control.

However, the ATM switch is disadvantageous in that the manufacturing cost is highly expensive and the control of the software/hardware is complicated, requiring a large-sized unit.

Moreover, in a system where cells are simply multiplexed, when the cells through plural connections mutually compete in the ATM cell multiplexer, some of the cells must be delayed or stood by to make the cells communicate without colliding in each of service categories such as CBR (Constant Bit Rate), VBR (Variable Bit Rate), and UBR (Unspecific Bit Rate).

This is not particularly allowed in a service category like CBR in which a time delay is strictly prohibited.

SUMMARY OF THE INVENTION

It is accordingly an object of the present invention to provide an ATM cell multiplexer which can simply and inexpensively assemble or disassemble cells without causing a time delay between terminal equipments and an ATM switchboard.

Namely, the ATM cell multiplexer according to the present invention is connected between terminal equipments 1 and an ATM switchboard 3 in the same manner as FIG. 1, and formed of an ATM bus scheduler 11, an ATM bus 12, and plural CLAD units 13-1 to 13-4 (represented by reference numeral 13), as schematically shown in FIG. 2.

The CLAD units 13 are connected in parallel on the ATM bus 12 and enable the cells to be transmitted to the ATM switchboard (see FIG. 1) through trunk circuit(line). Moreover, the ATM bus scheduler 11 serves to provide an opportunity when the cells out of the CLAD units 13 are transmitted. This ATM bus scheduler 11 achieves cell multiplexing operations and traffic controls without installing any ATM switch by controlling the transmission/reception of the cells on the ATM bus 12.

In this case, the schedule means that the ATM bus scheduler 11 gives a transmission right of the cells to each of the CLAD units 13. The ATM bus 12 transmits and receives the cell between the trunk circuit or backup circuit and the CLAD units 13.

The CLAD units 13 accommodate terminal circuits connected to the terminal equipments (see FIG. 1), and assemble data received from the terminal equipments in the form of cell which is to be transmitted to the ATM bus 12. The cells received from the ATM switchboard through the trunk circuit are also transmitted to the ATM bus 12 and each of the CLAD units 13.

The ATM bus scheduler 11 controls the ATM bus 12 as follows.

① When the cells are transmitted to the ATM bus 12 from a plurality of the CLAD units 13, the ATM bus scheduler 11 avoids the competition of the cells on the ATM bus 12.

② In order to transmit the cells to the ATM switchboard through the trunk circuit from the CLAD units 13 according to the service categories (CBR, rt (real time)-VBR, nrt (non-real time)-VBR, UBR) provided by the ATM forum, the ATM bus scheduler 11 gives the transmission right to each of the CLAD units 13 based on the service categories. Only when being given a transmission right by the ATM bus scheduler 11, the CLAD units 13 transmit the cell to the ATM bus 12.

③ The ATM bus scheduler 11 controls the cell transmission in agreement with the traffic quantity so that the transmission rate should not exceed a predetermined maximum cell rate (PCR) and average cell rate (SCR) when CLAD unit 13 transmit the cells.

It is to be noted that the above-mentioned ATM bus scheduler can control the transmission/reception of the cells by allocating the cells in the up and down directions equally on the ATM bus in case that a single trunk circuit is connected to the ATM switchboard.

Alternatively, the ATM bus scheduler can also control the reception of plural cells within a single time slot in the down direction while a single cell in the up direction in case that plural trunk circuits are connected to the ATM switchboard.

When there are a plurality of the above-mentioned trunk circuits and the physical speeds are mutually different, the ATM bus scheduler can select the detour or non-detour per each CLAD unit by thinning out a set interval in a memory table which determines the order of the transmission right given by the ATM bus.

It is possible that the ATM bus scheduler can extend the number of the trunk circuits by allocating the reception right per each CLAD unit in accordance with a preset schedule table by the traffic control which complies with a predetermined service category or the traffic quantity with respect to the cells not only in the up direction but also in the down direction.

It is also possible that an SVC call setting controller is provided besides the CLAD units to control the call set protocol, and to set in the CLAD units a connection ID determined on the trunk circuit, thereby connecting to the ATM switchboard.

The SVC call setting controller may set a virtual connection ID and have an SOFT-PVC function prescribed by the PNNI.

The above service categories may comprise CVR, rt-VBR, nrt-VBR, and UBR. The schedule table may be composed of a main table including all service categories except UBR and a sub-table including service categories with a lower priority for the transmission right. The ATM bus scheduler may assign the transmission right on the basis of the sub-table only when the CLAD units in the main table have abandoned the transmission rights.

The main table may be prepared so that the transmission rights for the CLAD units are equally allocated to every time slot in a frame in the order of CBR, rt-VBR and nrt-VBR and in the registration order of the CLAD units.

Alternatively, an ATM cell multiplexer according to the present invention may comprise plural CLAD units connected in parallel on an ATM bus so that ATM cells are assembled and disassembled between ATM cell interfaces equipments and an ATM switchboard, and an ATM bus scheduler for an ATM bus control connected to the CLAD units through the ATM bus, the ATM bus scheduler allocating a transmission right for each CLAD unit in accordance with a preset schedule table based on at least one of predetermined service categories and a traffic control corresponding to a traffic quantity for cell transmission in the up direction from the ATM cell interfaces to the ATM switchboard, and broadcasting the cells to all of the ATM cell interfaces which decide whether or not the cells addressed to the ATM cell interfaces for cell reception in the down direction from the ATM switchboard to the ATM cell interfaces.

BRIEF DESCRIPTION OF THE DRAWINGS

Throughout the figures, like reference numerals indicate identical or corresponding portions.

DESCRIPTION OF THE EMBODIMENTS

Hereinafter will be described embodiments of an ATM cell multiplexer according to the present invention.

Figure 3:
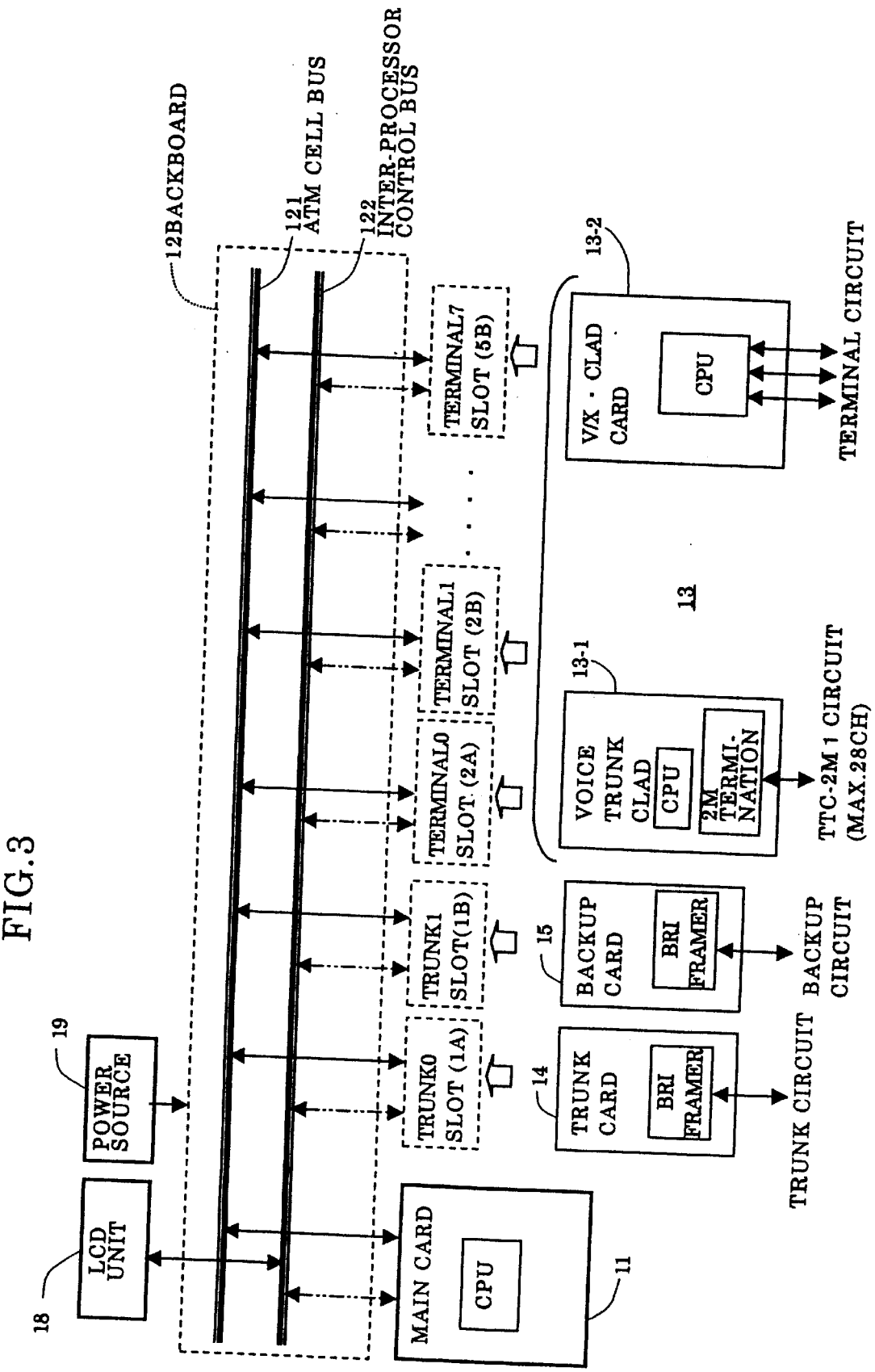
FIG. 3 is a block diagram showing an embodiment of an ATM cell multiplexer according to the present invention.

FIG. 3 shows a specific embodiment of the ATM cell multiplexer. This ATM cell multiplexer is composed of; a main card 11 having installed therein an ATM bus scheduler and a CPU for SVC controls; a backboard 12 having an ATM cell bus 121 and an inter-processor control bus 122; a trunk card 14 as a trunk circuit control unit connected between trunk circuits (basic trunk circuit) and the buses 121, 122; a backup card 15 as a backup circuit control unit connected between backup circuits and the buses 121, 122; a CLAD card 13 having installed therein a cell assembly/disassembly function; an LCD unit 18 as a display portion; and a power source 19. The CLAD card 13 includes voice trunk CLAD card 13-1 and V/X CLAD card 13-2 where the CPU is stored.

A general-purpose high speed digital interface is used for the above-mentioned trunk circuit and the backup circuit. For such an interface, an optical or electric interface circuit etc. can be used which satisfies a so-called I-interface condition provided by the ITU-T recommendation 1430A (or 1431A).

Figure 4:
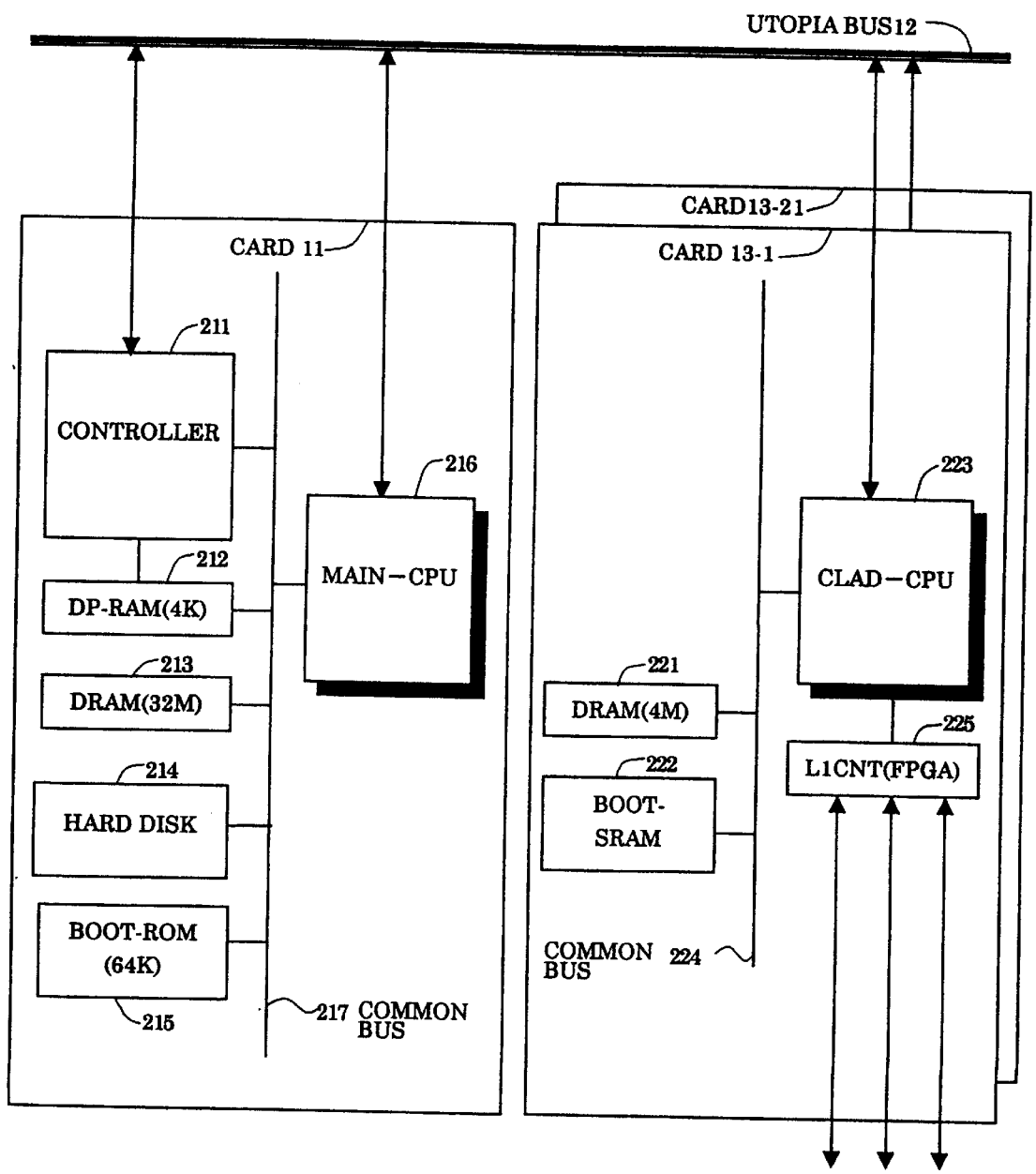
FIG. 4 is a block diagram showing an embodiment of actual detailed system of an ATM cell multiplexer according to the present invention.

A detailed embodiment of the above-mentioned main card 11 and the CLAD card 13 is shown in FIG. 4.

In this embodiment, the main card 11 has a controller 211 performing a bus competition control and a traffic control, a dual port RAM 212 holding a memory table, a DRAM 213, a hard disk 214 having stored therein a program and a configuration data file, a boot ROM 215, and a main CPU 216 mutually connected through a common bus 217.

Moreover, in the CLAD unit 13 a DRAM221, a boot SRAM 222, and a CLAD-CPU 223 are connected by a common bus 224. The DSU 224 which accommodates the terminal circuits is connected to the CPU 223.

Figure 5:
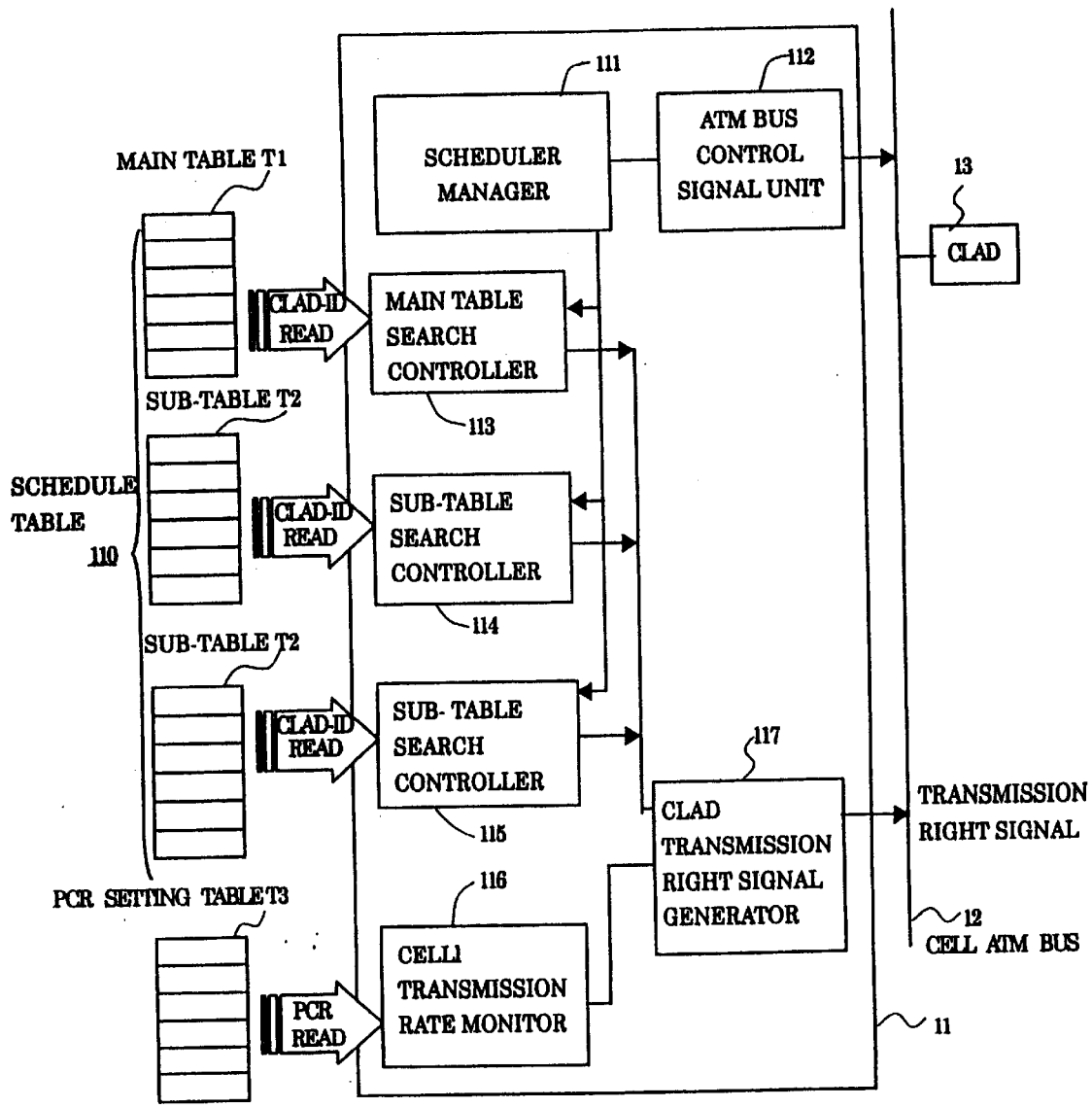
FIG. 5 is block diagram showing an arrangement of an ATM bus scheduler used in an ATM cell multiplexer according to the present invention.

(1) Arrangement of ATM Bus Scheduler:

As shown in FIG. 5, the ATM bus scheduler 11 is composed of; a schedule table 110 prescribing schedule timings; a scheduler manager 111; an ATM bus control signal portion 112 under the control of the scheduler manager 111 to give the transmission right to each of the CLAD units 13; search controllers 113–115 under the control of the scheduler manager 111 to perform a search control for the schedule table; a PCR setting table T4; a cell transmission rate monitor 116 for counting the number of transmitted cells per each CLAD unit; and a CLAD transmission right signal generator 117 for generating signals regarding the transmission right to each CLAD unit 13 from the output signals of the search controllers 113–115 and the cell transmission rate monitor 116.

In operation, the scheduler table 110 is set according to the maximum cell rate and the average cell rate preliminarily declared from the CLAD unit 13. The scheduler manager 111 gives the transmission right to the CLAD units 13 according to a CLAD unit identifier (hereinafter occasionally abbreviated as CLAD-ID) set in the scheduler table 110. The CLAD units 13 transmit the cells to the ATM bus 12 only when the transmission right is given from the scheduler 11.

The cell transmitting rate monitor 116 counts the transmitted number of cells from each CLAD unit 13 individually at predetermined intervals, and controls the number of cells so as not to exceed the maximum cell rate declared by the CLAD units 13. If the transmission cell rate of the CLAD units 13 exceeds the declared maximum cell rate, the ATM bus scheduler 11 controls so that the transmission right is given to other CLAD units 13 even on the transmission opportunities of the corresponding CLAD units 13.

(2) Embodiment of ATM Bus:

The ATM bus schedules the transmission right in both of the up direction (CLAD units 13→ATM switchboard 3) and the down direction (ATM switchboard 3→CLAD units 13), and controls the traffic of the entire unit.

First of all, the transfer in the down direction gives the transmission right of a fixed rate to each trunk circuit. The transfer in the up direction gives the transmission right according to the lowest cell rate assigned for each CLAD unit.

Figure 6:
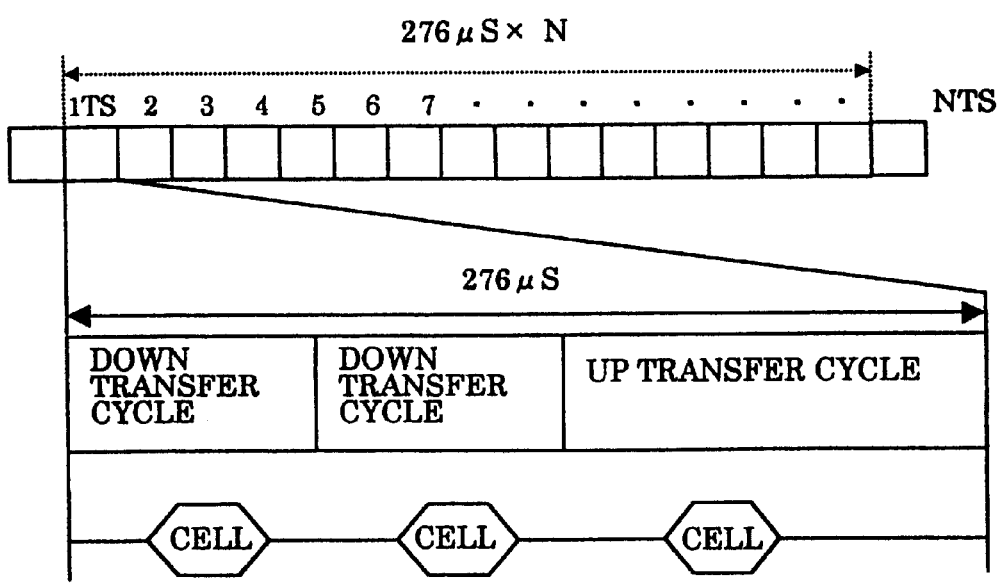
FIG. 6 is a diagram showing an embodiment of an ATM bus used in an ATM cell multiplexer according to the present invention.

FIG. 6 shows an embodiment of the ATM bus in case that the number of the trunk circuit is one or two and the speed of the trunk circuit is 1.5 Mbps.

Assuming that the speed of the trunk circuit be 1.5 Mbps, the cell transmission interval is 276 $\mu$s (1=1÷(1536÷8÷53 (single cell byte number)). The transmitting interval of the cell is assumed to be a single time slot (TS) on the ATM bus.

The transfer method in the down direction will now be described as follows.

If the trunk circuit is a single circuit without backup circuit, a cycle in which the cells are transferred in the down and up directions one by one within a single time slot is set.

If there are two trunk circuits or more which can be increased with the same principle, the transfer cycle in the down direction is two. As a result, two cells can be received from the trunk circuit within a single time slot (see FIG. 6).

The cells received from the trunk circuits are transmitted to the ATM bus every single time slot. The cells transmitted to the ATM bus are broadcast to all CLAD units connected to the ATM bus.

Figure 7:
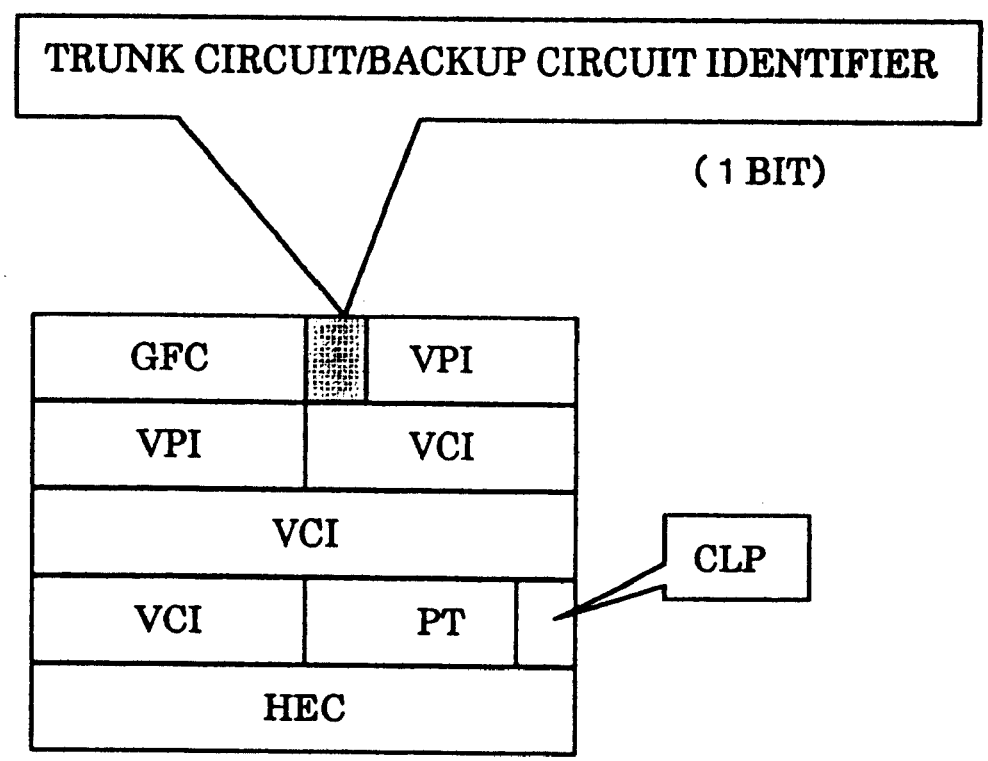
FIG. 7 is a format diagram of an ATM frame header used in an ATM cell multiplexer according to the present invention.

To the CLAD units, the connection ID, i.e. VPI/VCI shown in the ATM header of FIG. 7 of the cell which should be preliminarily received by itself is preset. Since the cells transmitted from the trunk circuits are broadcast on the ATM bus, all of the CLAD units receive the cells.

The CLAD units retrieve the connection ID of the received cells and determine whether or not they are addressed to themselves. The CLAD units receive the cells from the ATM bus if those cells are addressed to the CLAD units themselves and disregard them if not so.

Hereinafter will now be described a method as to how the CLAD units can recognize from which trunk circuit they have received the cells if two or more trunk circuits exist.

As shown in FIG. 6, the trunk circuit/backup circuit identifier is set in a significant one bit of VPI. This trunk circuit/backup circuit identifier is an identifier for recognizing from which trunk circuit the cell have been received. In the cells received from the backup circuit, the backup circuit controller sets up "1" in the trunk circuit/the backup circuit identifier of the cells. The cells received from the trunk circuit are passed with the unchanged identifier of "0". Referring to the significant one bit of VPI of the received cell, the CLAD units become possible from which trunk circuit the cells has been received.

A transfer method in the up direction will then be described. It is assumed that only one cell can be transmitted in a single time slot. Since a plurality of the CLAD units are connected on the ATM bus in parallel, if each of the CLAD units transmits the cells unconditionally, cell competitions will occur on the ATM bus.

The ATM bus scheduler arbitrates the ATM bus in the up direction to solve the above problem as follows.

The ATM bus scheduler gives the CLAD units the cell transmission right in the up direction in consideration of the traffic control. The CLAD units transmit the cells to the ATM bus only when the transmission right is given from the scheduler.

If two or more trunk circuits exist, the control method to select the trunk circuits will now be described.

The CLAD units set the trunk circuit/backup circuit identifier in the significant one bit of VPI as mentioned above. The trunk circuit/backup circuit identifier is an identifier for designating to which trunk circuit the cells should be transmitted. The CLAD unit sets "1" in the trunk circuit/backup circuit identifier when the cells are transmitted to the backup circuit while setting "0" when the cell is transmitted to the trunk circuit. The trunk circuit controller and the backup circuit controller can recognize whether the received cells are addressed to themselves or others by watching the significant one bit of VPI of the cells.

(3) Control of Service Category With Atm Bus Scheduler:

In order to support the above-mentioned service categories (CBR, rt-VBR, nrt-VBR, UBR) prescribed by the ATM forum, the ATM bus scheduler makes the undermentioned control for each service category.

It is now assumed that the priority order of how to give the transmission right be CBR→rt-VBR→nrt-VBR→UBR and a time for which there is no transmission cell even with a permission given be added to a time for the next transmitter. It is to be noted that the maximum cell rate (0+1) means the one converted for the cell even in either case of CLP=0 (cell non-abandonment) or CLP=1 (cell abandonment) in the header shown in FIG. 7.

Figure 8:
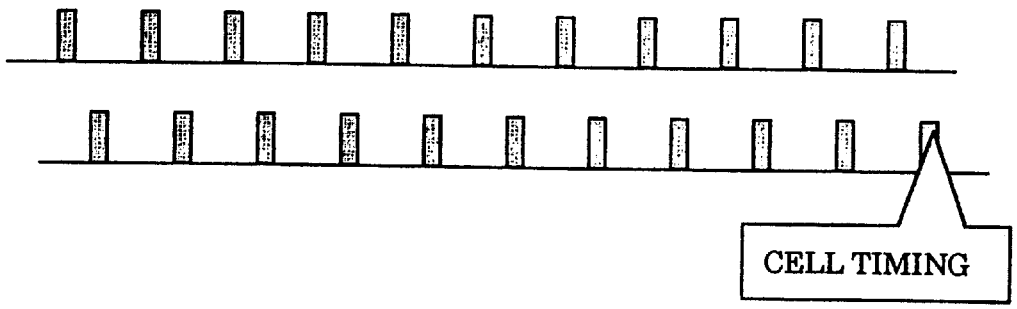
FIG. 8 is a time chart based on the CBR method used in an ATM cell multiplexer according to the present invention.

① CBR (see FIG. 8)

The transmission right is equally given to the CLAD units as the value of the maximum cell rate (0+1) indicates.

When being given to a CLAD unit, the transmission right is not assigned to other CLAD units even though there is no transmission data, so that empty cells are transmitted to the trunk circuit.

Figure 9:
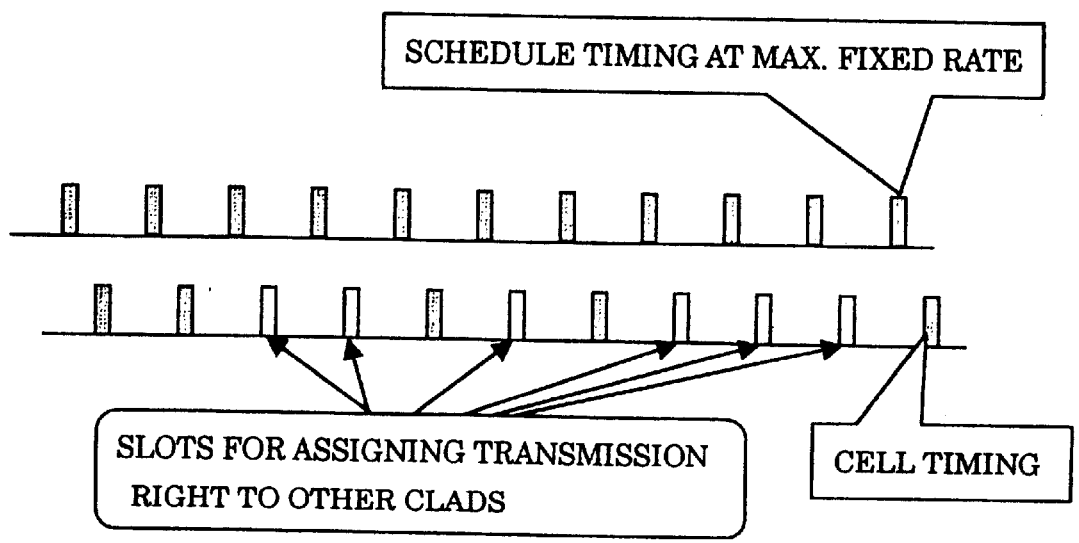
FIG. 9 is a time chart based on the rt-VBR method used in an ATM cell multiplexer according to the present invention.

② rt-VBR (see FIG. 9)

The transmission right is equally given as the value of maximum cell rate (0+1) indicates.

When being given to a CLAD unit having no transmission data, the transmission right is assigned to other CLAD units for nrt-VBR (nrt-VBR CLAD units).

Figure 10:
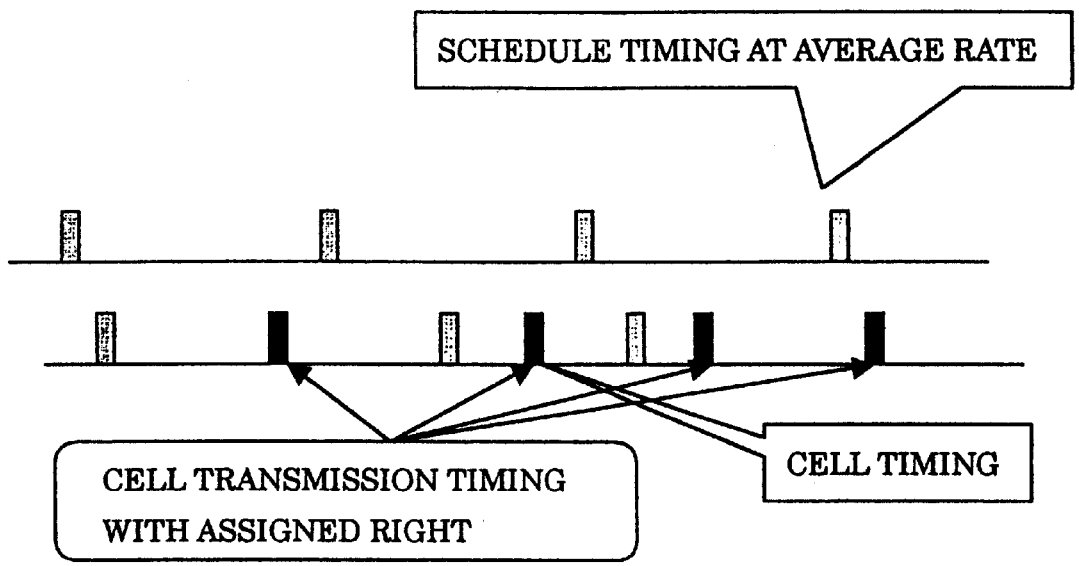
FIG. 10 is a time chart based on the nrt-VBR method used in an ATM cell multiplexer according to the present invention.

③ nrt-VBR (see FIG. 10)

The transmission right is equally given to the CLAD units at an average cell rate (0+1). However, if the average cell rate is not set up, the transmission right is distributed with the maximum cell rate (0+1)×α (a is arbitrary).

When being given to a CLAD unit having no transmission data, the transmission right is assigned to other CLAD units for nrt-VBR. The scheduler distributes the transmission right with round robin within the CLAD unit for nrt-VBR if the CLAD units for rt-VBR and nrt-VBR has abandoned the transmission right. However, the transmission right must not be distributed at more than the maximum cell rate (0+1).

This control is adopted to count the transmission cell number and not to generate the number of transmission right which exceeds the maximum cell rate (0+1). When the transmission right remains in nrt-VBR CLAD units, the transmission right is given to UBR CLAD units.

Figure 11:
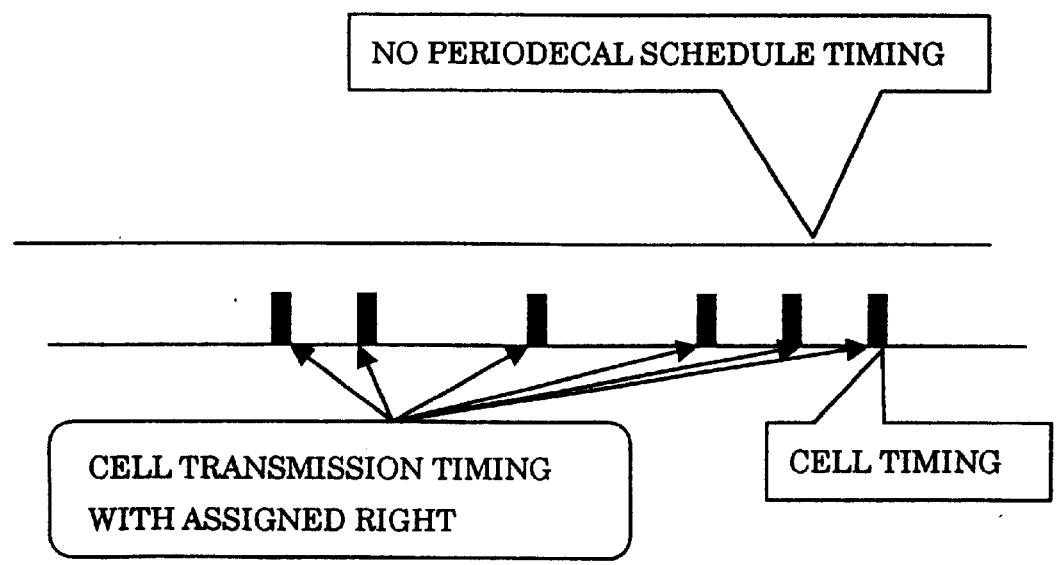
FIG. 11 is a time chart based on the UBR method used in an ATM cell multiplexer according to the present invention.

④ UBR (See FIG. 11)

UBR is not set up for transmission schedules. Only when all nrt-VBR connections have abandoned the transmission right, the transmission right is given to UBR CLAD units.

(4) Control of ATM Bus Scheduler

The principle of the ATM bus scheduler will now be described.

The ATM bus scheduler generates CLAD-ID (CLAD unit-identifier) which permits the cell transmission per each time slot of the ATM bus, and notifies the CLAD units through the ATM bus.

Each of the CLAD units transmits the cells only when its CLAD-ID is notified. The ATM bus scheduler has an ATM bus scheduler memory 110 (see FIG. 5) for controlling transmission opportunities for each of the CLAD units. In this scheduler memory 110, there are three kinds of tables as shown in FIG. 12.

Figures 12A, 12B, 12C:
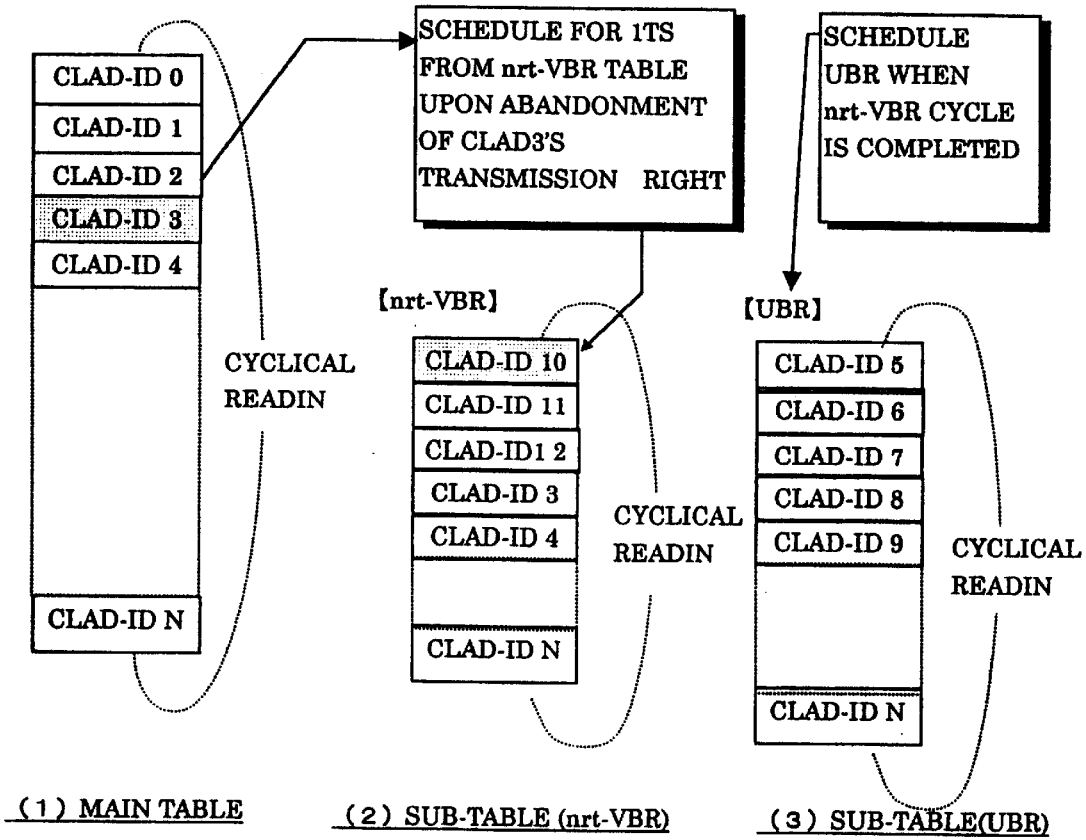
FIGS. 12A–12C are diagrams showing an example of a schedule memory table used in an ATM cell multiplexer according to the present invention.

In a main table shown in FIG. 12A, to which CLAD-ID the transmission opportunities are given for a single time slot of the ATM bus is set. In this main table, a schedule list of the CLAD units for CBR, rt-VBR, or nrt-VBR is set up in which cell transmission intervals for each CLAD-ID ("maximum cell rate", "average cell rate", or "maximum cell rate×α") are calculated when the CLAD units or the trunk circuit is registered or changed.

Figure 1:
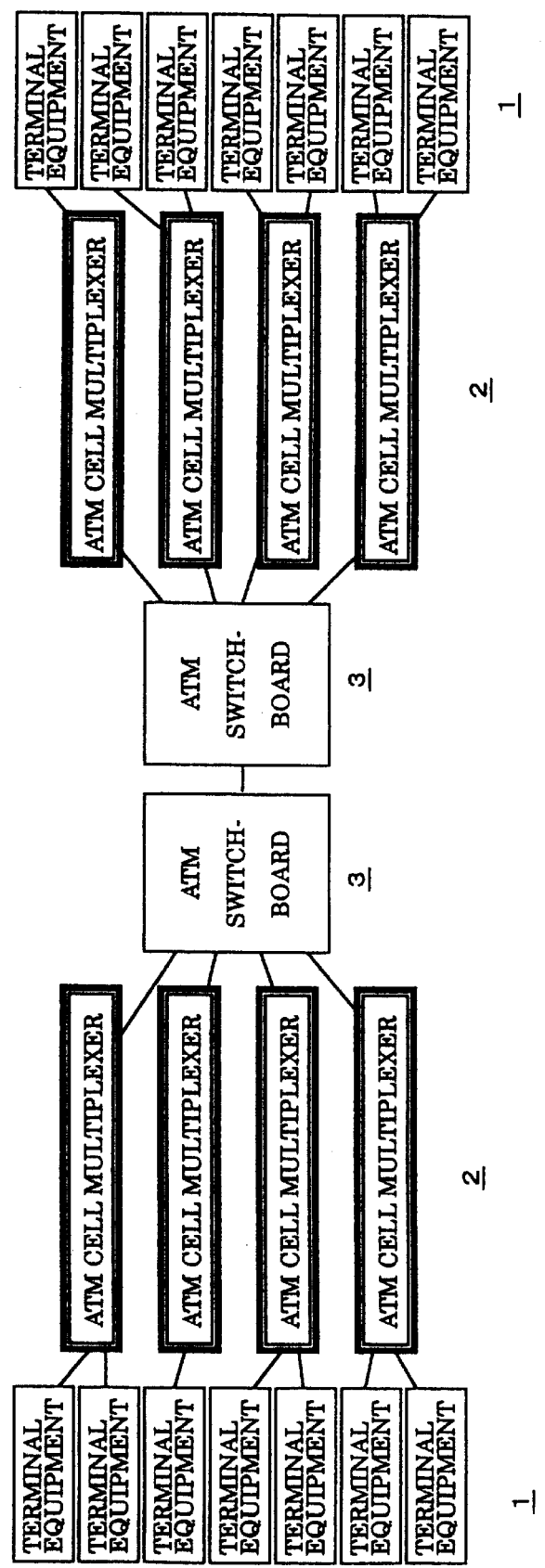
FIG. 1 is a block diagram showing an arrangement of an ATM cell multiplexer according to the present invention as well as the prior art.
Figure 2:
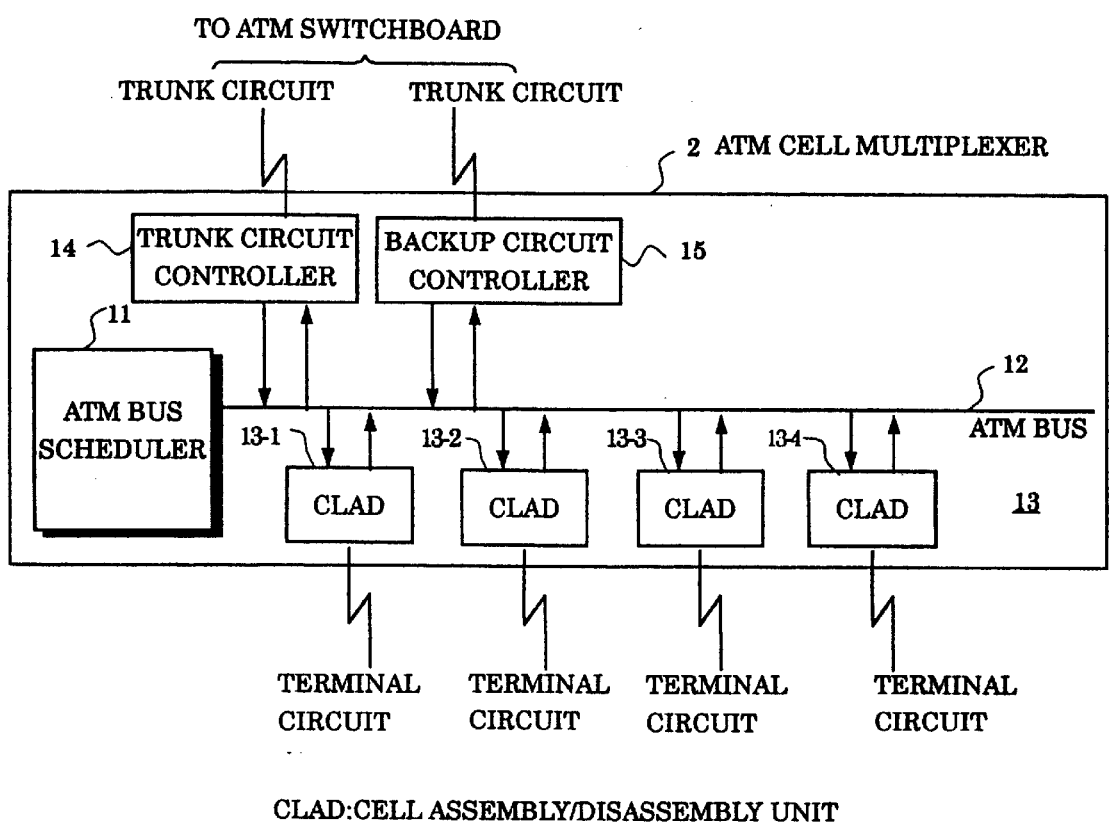
FIG. 2 is a block diagram showing a schematic arrangement of an ATM cell multiplexer according to the present invention.

A sub-table for nrt-VBR and a sub-table for UBR respectively shown in FIGS. 2B and 2C are ones which the scheduler makes reference for the insertion of the cells generated by other CLAD units into empty time slots and the transmission thereof if the CLAD units for rt-VBR and nrt-VBR in the main table has abandoned the transmission right, i.e. there is no transmission cell.

Namely, the ATM bus scheduler gives the schedule to the CLAD units in accordance with the order of the above scheduler table on the basis of the intervals corresponding to the physical speed of the trunk circuit.

The ATM bus scheduler prepares the schedule for the nrt-VBR CLAD units referring to the nrt-VBR sub-table shown in FIG. 12B if the rt-VBR CLAD units in the main table shown in FIG. 12A have abandoned the transmission right.

When one cycle of the transmission standby table for nrt-VBR is completed, that is all of the nrt-VBR CLAD units have abandoned the transmission right, the ATM bus scheduler prepares the schedule for UBR CLAD units referring to the UBR sub-table shown in FIG. 12C.

The preparation algorithm of the above main table will now be described referring to FIG. 13 in the following.

(1) For the ATM cell multiplexing of voice data, time slots exclusive for voice are reserved as a memory area where no data can be set by CLAD units other than the voice CLAD units because voice is strictly prohibited from being delayed.

(2) Taking an opportunity for setting voice SVC call, a CLAD-ID is set for the voice exclusive area. Taking an opportunity for releasing the voice SVC call, the CLAD-ID is removed from the voice exclusive area for empty time slots.

(3) Taking an opportunity for call setting, the voice CLAD units of 16 Kbps set the CLAD-ID in the main table twice in one period.

(4) Taking an opportunity for call setting, the voice CLAD units of 8 Kbps set the CLAD-ID in the main table once in one period.

(5) The CLAD units which have a higher maximum cell rate among CBR, rt-VBR, and nrt-VBR set the CLAD-ID preferentially. The CBR and rt-VBR CLAD units determine the number with the value of the maximum call rate (0+1). The nrt-VBR CLAD units set the CLAD-ID in view of the average cell rate (0+1) in the main table, and set the CLAD-ID in the rt-VBR sub-table at the ratio of {maximum cell rate (0+1)−average cell rate (0+1)}.

(6) The CLAD units for fast data of 64 Kbps etc. such as in a frame relay system set the CLAD-ID along the following procedure. At first the maximum cell rate (0+1) is calculated. It should be noted that the user frame length is 64 bytes.

Maximum cell rate (0+1)

$$=\text{physical speeed}/8\times 0 \ HA(n)\times(2\div 70)$$

$$=228.5714286 \ (\text{cell/second})$$

This maximum cell rate being divided by the maximum cell rate for one period, the following result is obtained:

$$228.5714286\div 21.56659765=10.5984=11 \ (TS)$$

Namely, the CLAD-ID is set in the main table eleven times per one period. The period of a time slot should be set up per 15 (168/11) time slots as much as possible. In the example of FIG. 13, the set TS positions are 6, 21, 36, 51, 66, 81, 96, 111, 126, 141, and 156. (7) A low speed circuit (PCR=8.57) such as 2.4 Kbps is deemed to have a single time slot, and scheduled at the same maximum cell rate (21.5) as 8 Kbps.

(8) The corresponding CLAD units set the CLAD-ID in the remaining empty time slots.

(9) If the CLAD units setting for two or more time slots are overlapped at the same number, the CLAD-ID set afterward is shifted by one time slot.

(10) In empty time slots, empty indication is set. The ATM bus scheduler schedules the nrt-VBR CLAD units for empty time slots. The empty indication is settable for voice exclusively. If no voice SVC is set in the empty indication, the scheduler schedules the nrt-VBR CLAD units.

(11) In the trunk speed of 128 Kbps, the CLAD units set the CLAD-ID every 12 (=1536/128) time slots. In the example of FIG. 13, the set TS positions are 1,13,25,37,49, 61,73,85,97,109,121,133, 145 and 157 where the total number of the CLAD units is 14 or less.

Figure 14:
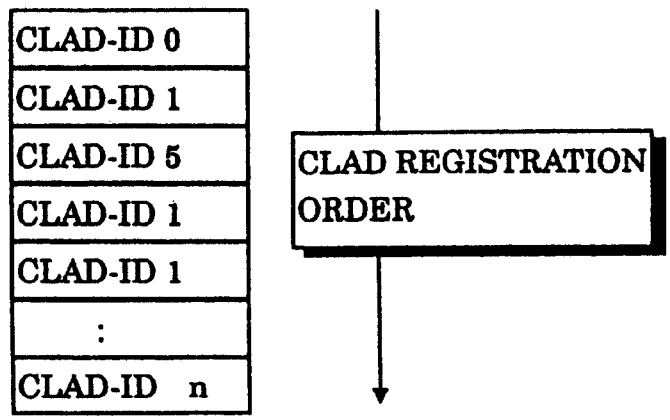
FIG. 14 is a diagram showing a preparation algorithm of a sub-table (nrt-VBR) in a schedule memory table in an ATM cell multiplexer according to the present invention.

The preparation algorithm of the sub-table (rt-VBR) is shown in FIG. 14. In this case, the corresponding CLAD units set the CLAD-ID in the table in the ascending order.

Since this sub-table is set in order of the registration of the CLAD units, the assigned transmission rights of the nrt- VBR CLAD units have no priority. It is assumed that the number of the CLAD units in this sub-table can be designated twice or more times so that the CLAD units can be weighted depending on the appearance frequency.

Figure 15:
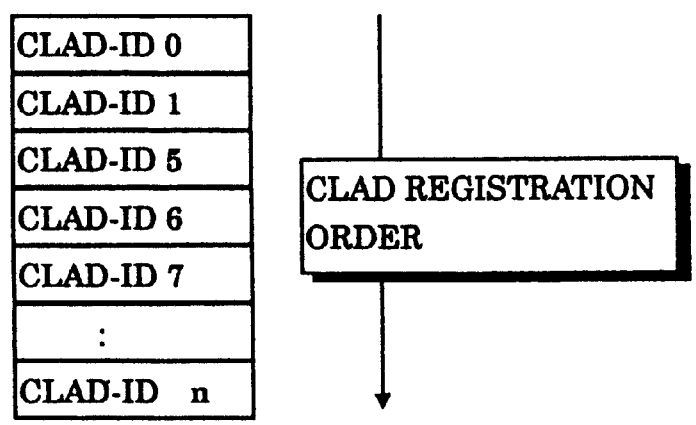
FIG. 15 is a diagram showing a preparation algorithm of a sub-table (UBR) in a schedule memory table in an ATM cell multiplexer according to the present invention.

The preparation algorithm of the sub-table (UBR) is shown in FIG. 15. In this case, the corresponding CLAD units set the CLAD-ID in the table in the ascending order of registration. Since this sub-table is set in order of the registration of the CLAD units, the assigned transmission rights of the UBR CLAD units have no priority. In this sub-table the number of the CLAD units should be set only once.

(5) Counters for maximum cell rate (PCR), average cell rate(SCR):

The ATM bus scheduler monitors the cell number with a maximum cell rate counter so that nrt-VBR CLAD units with the assigned transmission right may not exceed the maximum cell rate, and assigns the transmission right to other nrt-VBR CLAD units if the maximum cell rate is exceeded.

When the ATM bus scheduler assigns the transmission right to a CLAD unit, the CLAD unit transmits cells in the presence thereof but transmits no cell in the absence thereof. In the ATM bus scheduler, an ATM bus signal controller (112 in FIG. 5) can decide whether or not the CLAD unit has transmitted the cells. When the CLAD unit has transmitted the cells, a cell transmission counter is incremented. As a result, the cell number will be able to be calculated for each CLAD unit at a fixed time interval.

The ATM bus scheduler compares the maximum cell rate preliminarily set for each CLAD unit at a fixed period with the value of the cell transmission counter. When the transmission cell of the CLAD unit exceed the maximum cell rate, the ATM bus scheduler does not control the assignment of the transmission right to the corresponding CLAD unit.

(6) Determination of ATM Bus Scheduler Period:

The ATM bus scheduler sets beforehand the transmission order of the CLAD units in an ATM bus scheduler memory from which the cells are read out every time slot period to the scheduler bus for the notification. This memory is set up with a software upon the registration of the CLAD units or the circuits.

The size of the scheduler memory with reference to the number of time slot and circuit use rates is as follows:

① In case of a voice cell with the payload length of 40 bytes, the number of time slot is 144 in view of the circuit use rate of the trunk circuit being 100% and the voice accommodation efficiency being highest.

TABLE 1

| ITEM | VALUE | EQUATION |
| --- | --- | --- |
| TS NUMBER (MEMORY CAPACITY) | 144TS | |
| 1 PERIOD TIME | 39.744 (ms) | 144 × 0.276 (ms) = 39.744 (ms) |
| PCR PER 1 PERIOD | 25.1610306 (cell/s) | 1 × 1000 ÷ 39.744 = 25.1610306 |
| THROUGHPUT UPON SETTING 1TS | 10,668.27697 (bps) | 53 × 8 ÷ 39.744 × 1000 = 10,668.27697 (bps) |
| REAL THROUGHPUT OF 8kbps VOICE | 10,600 (bps) | 8000 × 53 ÷ 40 = 10,600 (bps) |
| ACCOMMODATION RATE OF 8kbps VOICE | 99.36 (%) | 10,600 ÷ 10,668.27697 × 100 = 99.36 (%) |
| REAL THROUGHPUT OF 16kbps VOICE | 21,200 (bps) | 16,000 × 53 ÷ 40 = 21,200 (bps) |
| ACCOMMODATION RATE OF 16kbps VOICE | 99.36 (%) | 21,200 ÷ (10,668.27697 × 2) × 100 = 99.36 (%) |

② In case of a voice cell with the payload length of 47 bytes where the number of time slot is 168 in view of the circuit use rate of the trunk circuit being 100% and the voice accommodation efficiency being highest.

TABLE 2

| ITEM | VALUE | EQUATION |
| --- | --- | --- |
| TS NUMBER (MEMORY CAPACITY) | 168TS | |
| 1 PERIOD TIME | 46.368 (ms) | 168 × 0.276 (ms) = 46.368 (ms) |
| PCR PER 1 PERIOD | 21.56659765 (cell/s) | 1 × 1000 ÷ 46.368 = 21.56659765 |
| THROUGHPUT UPON SETTING 1TS | 9,144.237405 (bps) | 54 × 8 ÷ 46.368 × 1000 = 9,144.237405 (bps) |
| REAL THROUGHPUT OF 8kbps VOICE | 9,021.277 (bps) | 8000 × 53 ÷ 47 = 9,021.277 (bps) |
| ACCOMMODATION RATE OF 8kbps VOICE | 98.66 (%) | 9,021.277 ÷ 9,144.237 × 100 = 98.66 (%) |
| REAL THROUGHPUT OF 16kbps VOICE | 18,042.55 (bps) | 16,000 × 53 ÷ 47 = 18,042.55 (bps) |
| ACCOMMODATION RATE OF 16kbps VOICE | 98.66 (%) | 18,042.55 ÷ (9,144.237405 × 2) × 100 = 99.36 (%) |

(7) Control of Backup Circuit:

In an ATM cell multiplexer having the trunk circuit composed of a basic trunk circuit used for normal operation and a backup (preparatory) circuit for guaranteeing the communication upon the fault of the basic trunk circuit, a backup control method where the physical speeds of the basic trunk circuit and the backup circuit are different will be described in the following.

When the physical speed of the backup circuit is higher than that of the basic trunk circuit, all connections to communicate with the basic trunk circuit can make a detour to the backup circuit. However, when the physical speed of the backup circuit is lower than that of the basic trunk circuit, all connections to communicate with the basic trunk circuit can not make a detour to the backup circuit due to a band difference. Therefore, it is necessary to select the detour or non-detour for each CLAD unit.

The embodiment of this case will be described taking an example where the physical speeds of the basic trunk circuit and the backup circuit are 1.5 Nbps and 64 Kbps, respectively.

In view of the physical speed of the basic trunk circuit being 1.5 Nbps, a single time slot is $0.267\,\mu s$. Assuming that one period be 168 time slots, when the cells are transmitted over all of the time slots, the following band is used.

$$168 \times 53 \times 8 \times (1 \div 0.46368) = 1536231.884 \text{ (bps)}$$

Namely, it is possible to provide the throughput of 1.5 Nbps.

Figure 13:
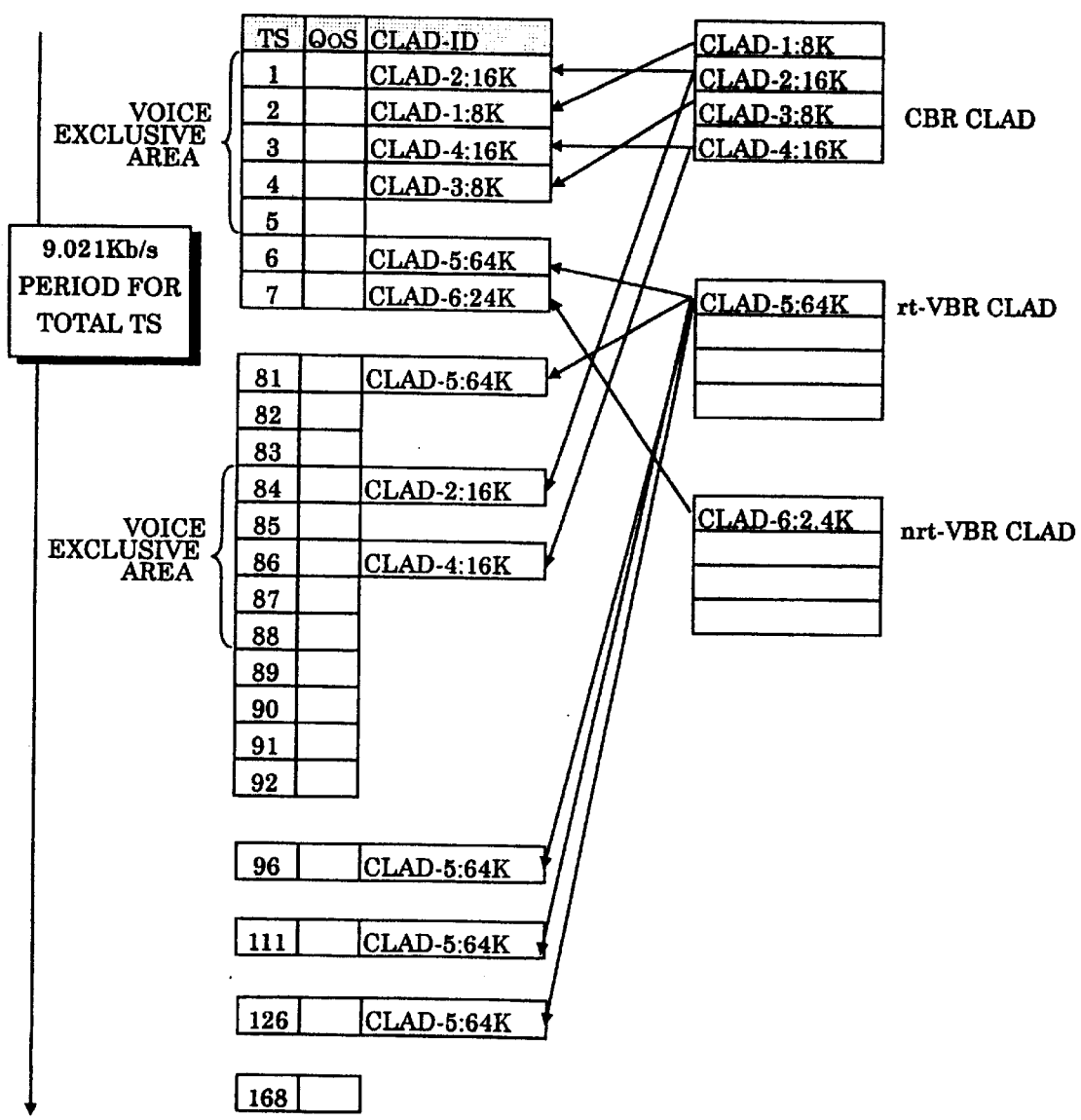
FIG. 13 is a diagram showing a preparation algorithm of a main table in a schedule memory table used in an ATM cell multiplexer according to the present invention.

In view of the physical speed of the backup circuit being 64 kpbs, for setting up the main table shown in FIG. 13, the CLAD units making a detour upon the connection of the backup circuit set the CLAD-ID every 24 time slots which are ITS, 25 TS, 49 TS, 73 TS, 97 TS, 121 TS, and 145 TS, for example.

The CLAD units not making a detour upon the connection of the backup circuit are preset to other time slots than the above-noted time slots.

When the basic trunk circuit is faulted and the backup circuit is connected, the physical speed is shifted from 1.5 Nbps to 64 kbps. In this case, the ATM bus scheduler changes the schedule of the readin from the main table every single time slot to the schedule every 24 time slots by taking an opportunity of the physical speed having been changed whereby only the CLAD units set every 24 time slots are provided with the transmission right to select the CLAD units with a detour or those without a detour.

Likewise, in case of the physical speed of the backup circuit being 128 kbps, the CLAD units should be set every 12 time slots.

(8) Expanded Example of Trunk Circuit Number:

Basically, the ATM cell multiplexer has two trunk circuits (basic trunk circuit plus backup circuit) at most. By using this assumption the above description has been made with reference to a method which can efficiently control the up and down directions at a low cost.

Namely, since FIG. 6 is illustrated assuming that there are two trunk circuits, the cells in the down direction can be received unconditionally up to two cells for every single time slot. In the up direction, only one cell can be transmitted for every single time slot under the control of the scheduler.

However, if the cells in the down direction are changed to have the same scheduler method as the up direction, the number of the trunk circuit is not restricted theoretically, as will be described in the following.

Even in the down direction, a scheduler function with the same organization as the up direction is provided. Through a couple of the schedulers, the transmission right of one cell is provided in the up and down directions per a single time slot. The trunk circuit controller 14 (see FIG. 2) is made to declare the same maximum cell rate as the CLAD units, thereby preparing the main table. Those two schedulers provide the transmission right once for every single time slot which is to be given to the CLAD units and the trunk circuit controllers.

By the above-noted control, the number of trunk circuits can be infinitely expanded.

(9) Coordinated Function With ATM Switchboard:

A coordinated function between the ATM cell multiplexer and the ATM switchboard will now be described in the following.

Because of the ATM switchboard having included therein an ATM switch (ATM-SW shown in FIG. 17), the connection ID (VPI/VCI) of the trunk circuit is different from that of the terminal equipments i.e. the CLAD units so that the ATM switch can convert the connection ID.

On the other hand, the ATM cell multiplexer is generally known as a unit not installing the ATM switch. Therefore, it is required that the connection ID of the trunk circuits is the same as that of the cells generated by the CLAD units.

To meet this requirement, the CLAD units are required to have the following three functions.

(1) In case of PVC (Permanent Virtual Circuit) connection, the connection ID provided by the trunk circuit should be settable for the CLAD units for every connection.

(2) In the case of SVC (Switched Virtual Circuit) connection, the connection ID determined with the trunk circuit upon call setting should be settable for the CLAD units per each call.

Figure 16:
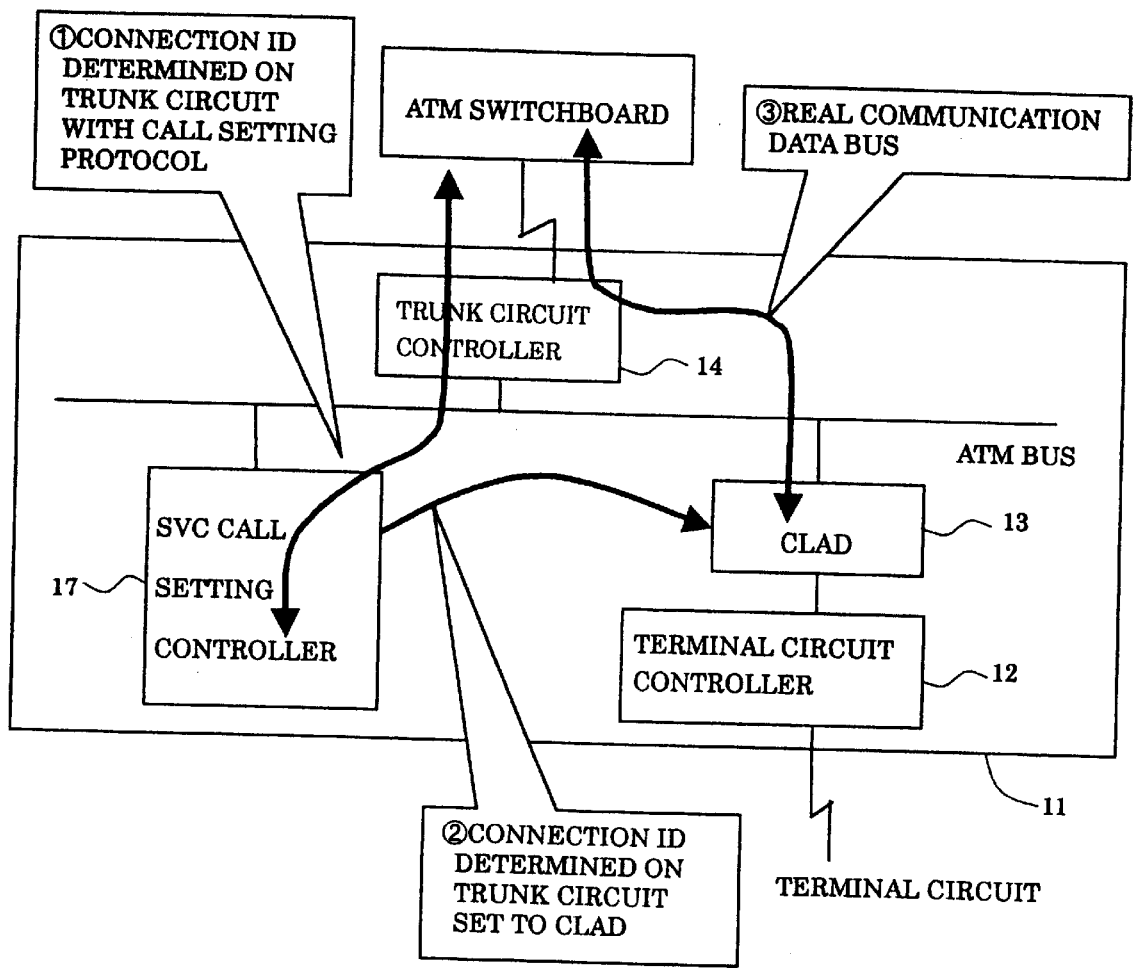
FIG. 16 is a block diagram showing an operation of a SVC connection ID in an ATM cell multiplexer according to the present invention.

An arrangement of this ATM cell multiplexer is shown in FIG. 16.

The ATM cell multiplexer 11 is provided with an SVC call setting controller 17 in addition to the above-noted CLAD unit 13, the trunk circuit 14, and the terminal equipment circuit controller 16.

The SVC call setting controller 17 determines the connection ID on the trunk circuit as shown by ① in accordance with the ATM call setting protocol, e.g. ATM forum UNI4.0 at the time (opportunity) of setting calls such as the time of data reception from the terminal equipments, the time of switching on the power source, and the time of receiving call setting messages.

The SVC call setting controller 17 sets the determined connection ID to the CLAD unit 13 as shown by ②. The CLAD unit 13 transmits and receives the cells with the set connection ID. As a result, the cells can be multiplexed/demultiplexed in the ATM cell multiplexer without the ATM switch as shown by ③.

(3) In case of soft-PVC provided by PNNI (Private Network—Network Interface) of the ATM forum, it is necessary that the connection ID of the addressed CLAD units having been converted by the ATM switch is set in the call setting message. Since the ATM cell multiplexer does not install the ATM switch, a virtual connection ID should be designated.

This virtual connection ID is used to decide which CLAD unit has the cells addressed thereto in the plural CLAD units within the ATM cell multiplexer. For the connection ID of actual communication cells, the connection ID determined by the trunk circuit between the ATM cell multiplexer and the ATM switchboard is set to the CLAD unit of the ATM cell multiplexer.

Figure 17:
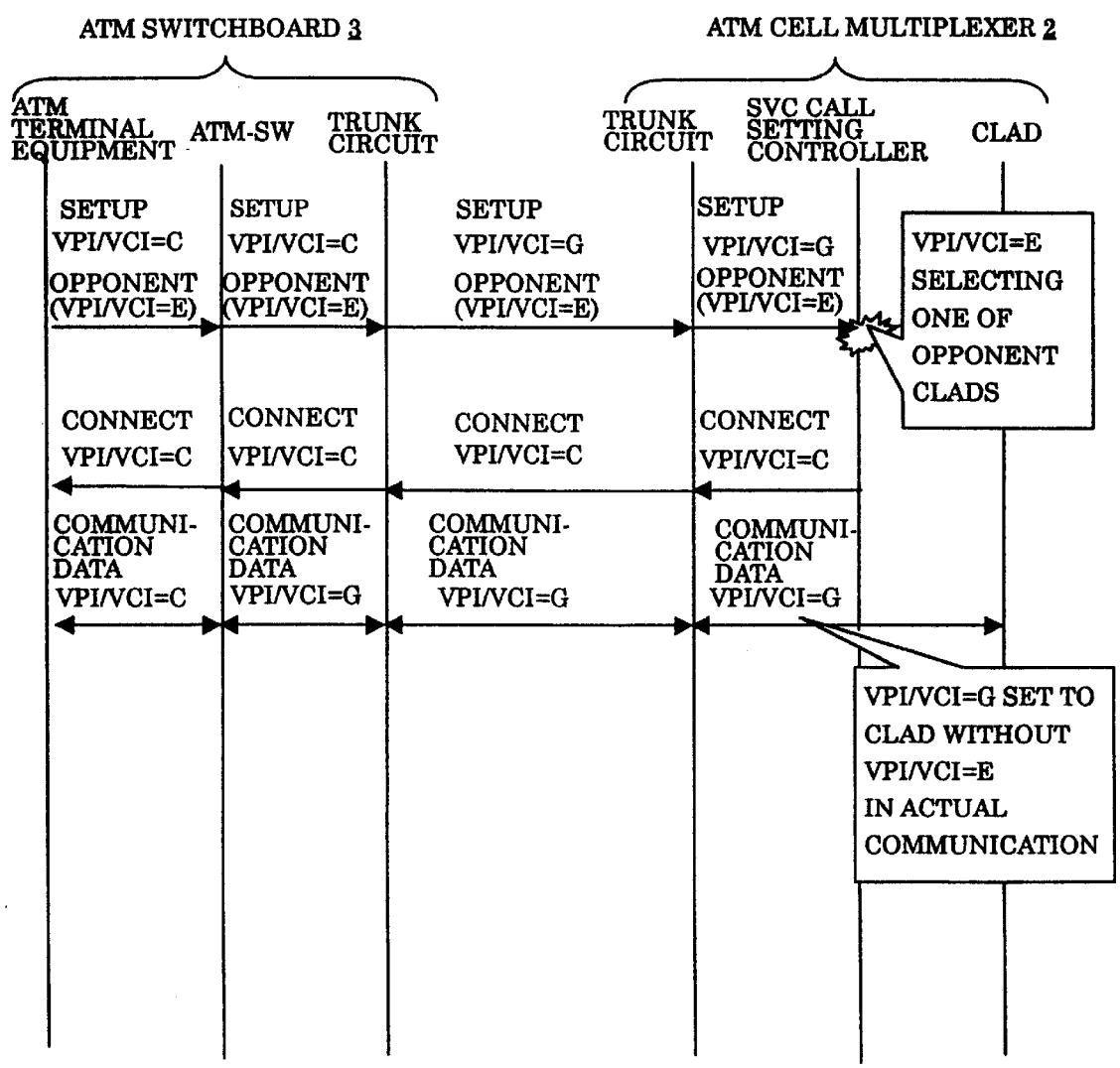
FIG. 17 is a sequence diagram showing a SOFT-PVC communication method in an ATM cell multiplexer according to the present invention.

A setting sequence of the SVC connection ID is shown in FIG. 17.

The opponent VPI/VCI means an addressed connection ID used with the PNNI of the ATM forum. With SETUP message received from the ATM switchboard 3, the opponent having VPI/VCI=E selects the CLAD unit E in the SVC call setting controller 17. In actual communication, the connection ID of VPI/VCI=G of the ATM switch board is used.

(10) Application to ATM switch:

While the terminal circuits have been all described with the assumption of the CLAD units, not only the CLAD units but also a simple pseudo switch of a low price which realizes the connection of multi-points to multi-points can be applied by supporting the ATM cell interface directly.

For the embodiment, the CLAD units can be substituted by the ATM-UNI interface.

As having been described, the ATM cell multiplexer according to the present invention is arranged so that in the up direction from the terminal equipment to the ATM switchboard the ATM bus scheduler allocates the transmission rights for each CLAD unit in accordance with a preset schedule table and predetermined service categories or traffic control for the transmission of cells, and in the down direction from the ATM switchboard to the terminal equipment the cells are broadcast to all of the CLAD units which decide for the reception of the cells as to whether or not the cells are addressed to themselves. Therefore, the following effects are obtained.

(1) Without any ATM switch, traffic control (CVR, VBR, UBR) is made possible and the developing cost and manufacturing cost of the ATM cell multiplexer can be reduced as well as the size.

(2) Without any ATM switch, PVC, SVC, SOFT-PVC are made possible and the developing cost and manufacturing cost of the ATM cell multiplexer can be largely reduced.

(3) The number of the trunk circuits can be easily expanded, resulting in the increased expansion of the ATM cell multiplexer.

(4) According to the set intervals of the schedule table, selection between a detour and non-detour can be made for each CLAD unit if the physical speeds are different between the basic trunk circuit and the backup circuit.

What we claim is:

1. An ATM cell multiplexer comprising:
plural CLAD units connected in parallel on an ATM bus so that ATM cells are assembled and disassembled between terminal equipments and an ATM switchboard, and
an ATM bus scheduler for an ATM bus control connected to the CLAD units through the ATM bus,
the ATM bus scheduler allocating a transmission right for each CLAD unit in accordance with a preset schedule table based on at least one of predetermined service categories and a traffic control corresponding to a traffic quantity for cell transmission in the up direction from the terminal equipments to the ATM switchboard, and broadcasting the cells to all of the CLAD units which decide whether or not the cells are addressed to the CLAD units for cell reception, in the down direction from the ATM switchboard to the terminal equipments.

2. An ATM cell multiplexer as claimed in claim 1 wherein if there is a single trunk circuit connected to the ATM switchboard, the ATM bus scheduler allocates the cells equally in the up and down directions on the ATM bus whereby the transmission/reception of the cells is controlled.

3. An ATM cell multiplexer as claimed in claim 1 wherein if there are plural trunk circuits connected to the ATM switchboard, the ATM bus scheduler controls so that the plurality of cells can be received for a single time slot in the down direction and a single cell in the up direction.

4. An ATM cell multiplexer as claimed in claim 3 wherein if the physical speeds of the plural trunk circuits are different from each other, the ATM bus scheduler sets thinned-out intervals of a memory table which determines the order for providing the transmission right of the ATM bus, thereby enabling each of the CLAD units to select a detour or non-detour.

5. An ATM cell multiplexer as claimed in claim 3 wherein the ATM bus scheduler allocates a reception right for each CLAD unit in accordance with the schedule table preset by at least one of the predetermined service categories and the traffic control corresponding to the traffic quantity, thereby enabling the number of the trunk circuits to be expanded.

6. An ATM cell multiplexer as claimed in claim 1, further comprising an SVC call setting controller in addition to the CLAD units, the SVC call setting controller controlling a call setting protocol to set a connection ID determined on the trunk circuits to the CLAD units for the connection with the ATM switchboard.

7. An ATM cell multiplexer as claimed in claim 6 wherein the SVC call setting controller sets a virtual connection ID and has an SOFT-PVC function prescribed by the PNNI.

8. An ATM cell multiplexer as claimed in claim 1 wherein the service categories comprise CVR,rt-VBR, nrt-VBR, and UBR.

9. An ATM cell multiplexer as claimed in claim 5 wherein the service categories comprise CVR,rt-VBR, nrt-VBR, and UBR.

10. An ATM cell multiplexer as claimed in claim 8 wherein the schedule table is composed of a main table including all service categories except UBR and a sub-table including service categories with a lower priority for the transmission right, and the ATM bus scheduler assigns the transmission right on the basis of the sub-table only when the CLAD units in the main table have abandoned the transmission rights.

11. An ATM cell multiplexer as claimed in claim 9 wherein the schedule table is composed of a main table including all service categories except UBR and a sub-table including service categories with a lower priority for the transmission right, and the ATM bus scheduler assigns the transmission right on the basis of the sub-table only when the CLAD units in the main table have abandoned the transmission rights.

12. An ATM cell multiplexer as claimed in claim 10 wherein the main table is prepared so that the transmission rights for the CLAD units are equally allocated to every time slot in a frame in the order of CBR, rt-VBR and nrt-VBR and in the registration order of the CLAD units.

13. An ATM cell multiplexer as claimed in claim 11 wherein the main table is prepared so that the transmission rights for the CLAD units are equally allocated to every time slot in a frame in the order of CBR, rt-VBR and nrt-VBR and in the registration order of the CLAD units.

14. An ATM cell multiplexer comprising:
plural CLAD units connected in parallel on an ATM bus so that ATM cells are assembled and disassembled between ATM cell interfaces and an ATM switchboard, and
an ATM bus scheduler for an ATM bus control connected to the CLAD units through the ATM bus,
the ATM bus scheduler allocating a transmission right for each CLAD unit in accordance with a preset schedule table based on at least one of predetermined service categories and a traffic control corresponding to a traffic quantity for cell transmission in the up direction from the ATM cell interfaces to the ATM switchboard, and broadcasting the cells to all of the ATM cell interfaces which decide whether or not the cells are addressed to the ATM cell interfaces for cell reception, in the down direction from the ATM switchboard to the ATM cell interfaces.

* * * * *